(12) United States Patent
Yamaoka et al.

(10) Patent No.: US 10,817,068 B2
(45) Date of Patent: Oct. 27, 2020

(54) VEHICLE SYSTEMS AND METHODS FOR DETERMINING TARGET BASED ON SELECTING A VIRTUAL EYE POSITION OR A POINTING DIRECTION

(71) Applicant: Toyota Research Institute, Inc., Los Altos, CA (US)

(72) Inventors: Masaaki Yamaoka, San Jose, CA (US); Yuki Horiuchi, Santa Clara, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 331 days.

(21) Appl. No.: 15/877,911

(22) Filed: Jan. 23, 2018

(65) Prior Publication Data
US 2019/0227635 A1 Jul. 25, 2019

(51) Int. Cl.
| | | |
|---|---|---|
| *G06F 3/01* | (2006.01) | |
| *G06F 3/0346* | (2013.01) | |
| *B60W 50/10* | (2012.01) | |

(52) U.S. Cl.
CPC ............. *G06F 3/017* (2013.01); *B60W 50/10* (2013.01); *G06F 3/013* (2013.01); *G06F 3/0346* (2013.01);
(Continued)

(58) Field of Classification Search
CPC . G06F 3/12; G06F 3/013; G06F 3/014; G06F 3/017; G06F 2203/0381;
(Continued)

(56) References Cited

U.S. PATENT DOCUMENTS 9,823,744 B2 * 11/2017 Publicover .............. G06F 21/64
10,074,031 B2 9/2018 Krenzer et al.
(Continued)

FOREIGN PATENT DOCUMENTS

| JP | 6106402 B2 | 3/2017 |
|---|---|---|
| JP | 2017090615 A | 5/2017 |
| WO | 2005023598 A1 | 3/2005 |

OTHER PUBLICATIONS

Non-Final Office Action dated Apr. 15, 2020 in related U.S. Appl. No. 15/877,892, 39 pages total.
(Continued)

*Primary Examiner* — Thomas G Black
*Assistant Examiner* — Sara J Lewandroski
(74) *Attorney, Agent, or Firm* — Dinsmore & Shohl LLP

(57) ABSTRACT

Vehicle systems and methods for determining a final target position based on either a first target position and a second target position are disclosed. A vehicle includes a user detection system configured to output a gesture signal in response to a hand of a user performing at least one gesture to indicate a final target position. The vehicle also includes a user gaze monitoring system configured to output an eye location signal that indicates an actual eye position of the user. The vehicle also includes one or more processors and one or more non-transitory memory modules communicatively coupled to the processors. The processors store machine-readable instructions that, when executed, cause the one or more processors to select either the first target position or the second target position as the final target position based on a first accuracy and a second accuracy.

20 Claims, 10 Drawing Sheets

(52) U.S. Cl.
CPC . *B60W 2540/00* (2013.01); *G06F 2203/0381* (2013.01)

(58) Field of Classification Search
CPC ......... B60W 2554/4048; B60W 50/10; B60W 2540/225; H04N 13/383; B60K 2370/146; B60K 2370/1464; B60K 2370/149
See application file for complete search history.

(56) References Cited

U.S. PATENT DOCUMENTS

| | | | |
|---|---|---|---|
| 2010/0283722 A1* | 11/2010 | Thorn | G06F 1/1626 345/156 |
| 2011/0267265 A1* | 11/2011 | Stinson | G06F 3/017 345/157 |
| 2014/0184494 A1* | 7/2014 | Burachas | G06F 3/012 345/156 |
| 2014/0226002 A1* | 8/2014 | Metzler | G01C 1/04 348/78 |
| 2014/0361977 A1* | 12/2014 | Stafford | G06F 3/013 345/156 |
| 2015/0135144 A1* | 5/2015 | Kim | G06F 3/14 715/850 |
| 2015/0277700 A1* | 10/2015 | He | 715/852 |
| 2016/0179205 A1* | 6/2016 | Katz | G06F 3/017 345/156 |
| 2016/0335475 A1* | 11/2016 | Krenzer | G06K 9/00335 |
| 2017/0032214 A1 | 2/2017 | Krenzer et al. | |
| 2017/0068322 A1* | 3/2017 | Steinberg | G06F 3/017 |
| 2017/0147078 A1* | 5/2017 | van Laack | G06F 3/013 |
| 2017/0228018 A1 | 8/2017 | Schaeferjohann | |
| 2017/0329411 A1* | 11/2017 | van Laack | G06F 3/017 |
| 2018/0088676 A1* | 3/2018 | Ach | G06F 3/04842 |
| 2019/0163268 A1* | 5/2019 | Shin | H04N 13/204 |
| 2019/0210615 A1* | 7/2019 | Caron | B60W 50/14 |
| 2019/0227635 A1* | 7/2019 | Yamaoka | G06F 3/017 |
| 2019/0228242 A1* | 7/2019 | Yamaoka | G06K 9/00604 |
| 2019/0228243 A1* | 7/2019 | Yamaoka | G06F 3/0304 |
| 2019/0258318 A1* | 8/2019 | Qin | G10L 15/22 |
| 2019/0318181 A1* | 10/2019 | Katz | B60W 40/08 |

OTHER PUBLICATIONS

Notice of Allowance dated Mar. 25, 2020 in related U.S. Appl. No. 15/877,906, 13 pages total.

Non-Final Office Action dated Dec. 31, 2019 in related U.S. Appl. No. 15/877,906, 14 pages total.

* cited by examiner

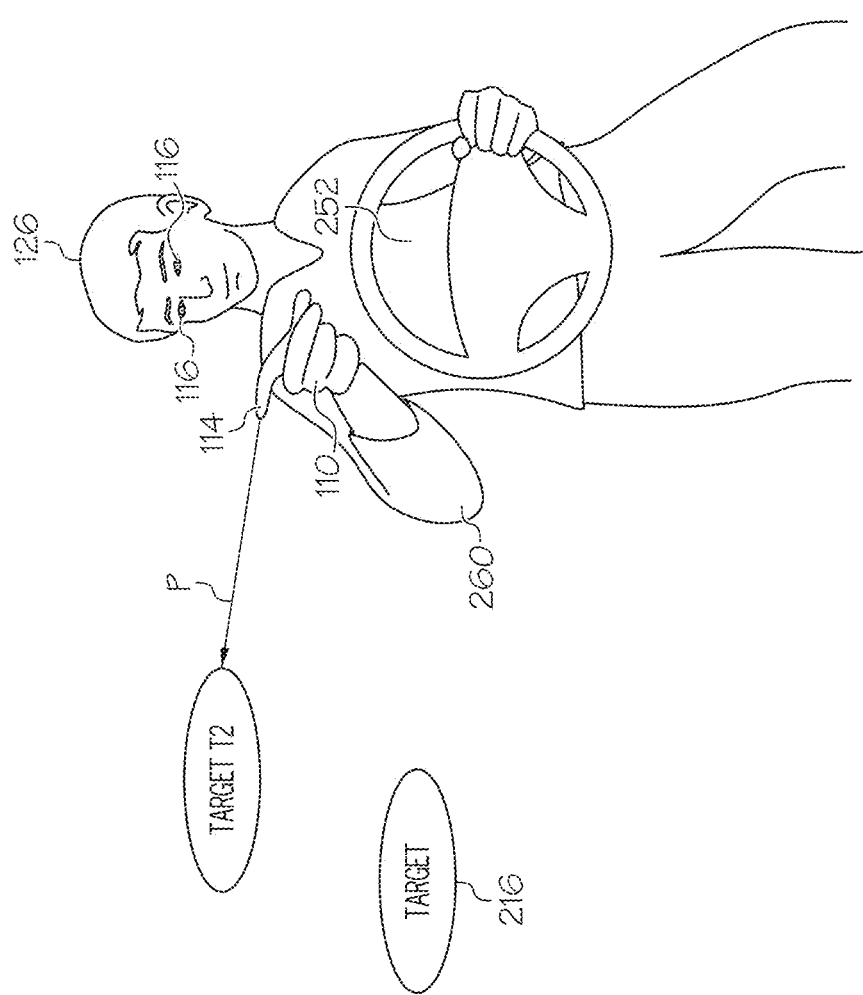

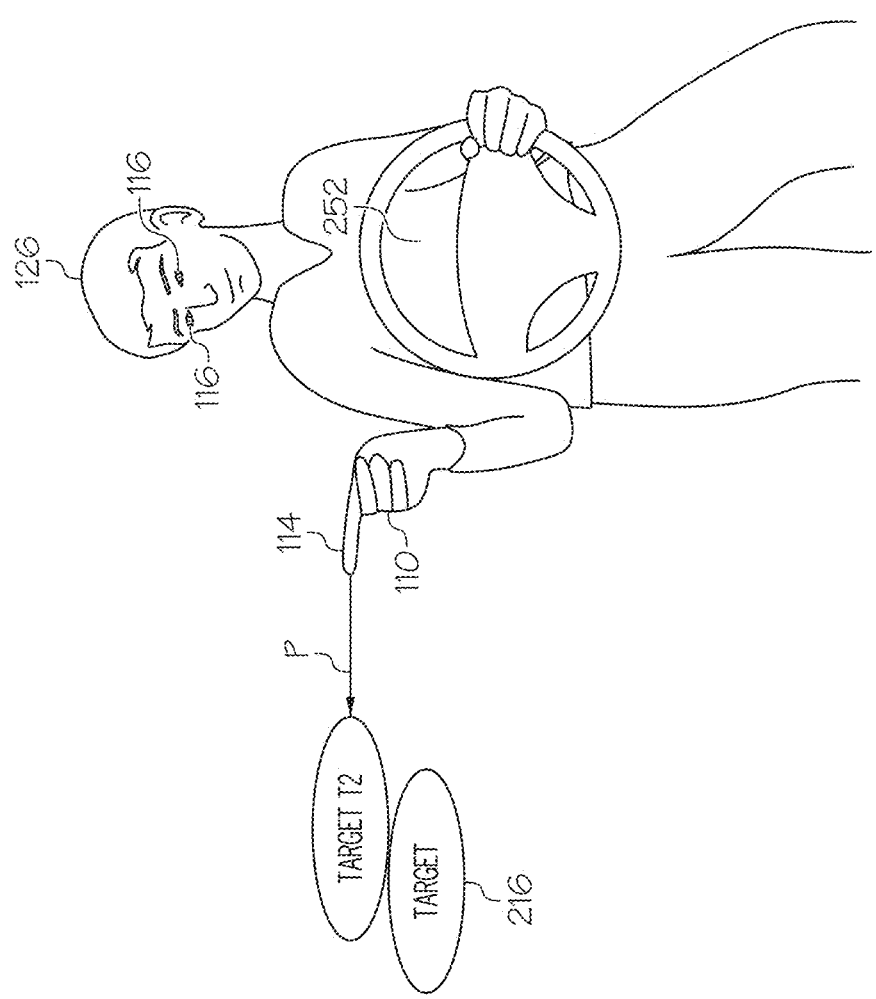

VEHICLE SYSTEMS AND METHODS FOR DETERMINING TARGET BASED ON SELECTING A VIRTUAL EYE POSITION OR A POINTING DIRECTION

TECHNICAL FIELD

Embodiments described herein generally relate to vehicles and, more specifically, to vehicles having systems that determine a target position that a user is gesturing towards, where the user's gaze is directed towards a location other than the target position.

BACKGROUND

Some types of vehicle systems may allow a driver or passenger to provide input without manipulating buttons or other tactile inputs. More specifically, the vehicle may receive nonverbal communication from an individual using hand gestures. The vehicle includes sensors to detect the movement and position of an individual's hand, and determines the information the individual is attempting to convey based on the movement and position of the hand. However, some challenges may exist in certain situations that can limit the system's ability to interpret some of the information expressed by an individual's hands.

In addition to systems that allow for a driver to provide input based on hand gestures, some vehicles include an eye-tracking system that is capable of tracking the driver's gaze direction. The driver's gaze direction may be used to determine the driver's level of awareness as he or she is operating the vehicle. The driver normally directs his or her attention towards the environment located in front of the vehicle. Therefore, drivers typically direct their gaze away from the front of the road for only a few moments at a time while operating the vehicle. For example, a driver may turn his or her head to the side and look out of one of the side windows of a vehicle, but only for a few seconds. Accordingly, eye-tracking systems are limited in their ability to determine commands based on the gaze direction of the driver.

SUMMARY

In one embodiment, a vehicle includes a user detection system configured to output a gesture signal in response to a hand of a user performing at least one gesture to indicate a final target position. The vehicle also includes a user gaze monitoring system configured to output an eye location signal that indicates an actual eye position of the user. The vehicle also includes one or more processors and one or more non-transitory memory modules communicatively coupled to the one or more processors. The processors store machine-readable instructions that, when executed, cause the processors to determine a first point and a second point located on the hand of the user based at least in part on the gesture signal from the user detection system. The first point and the second point define a pointing direction of the hand of the user. The processors are also caused to calculate a virtual eye position based at least in part on a first point located on the hand of the user and the actual eye position. The processors are further caused to calculate a first target position based on the virtual eye position and a second target position based on the pointing position of the hand of the user. The first target position includes a first accuracy and the second target includes a second accuracy. The processors are caused to determine the final target position by selecting the first target position and the second target position based on a first accuracy and a second accuracy. Finally, the processors are caused to control at least one vehicle system based at least in part on the final target position.

In another embodiment, a vehicle includes a user detection system configured to output a gesture signal in response to a hand of a user performing at least one gesture to indicate a final target position. The vehicle also includes a user gaze monitoring system configured to output an eye location signal that indicates an actual eye position of the user. The vehicle also includes one or more processors and one or more non-transitory memory modules communicatively coupled to the one or more processors. The processors store machine-readable instructions that, when executed, cause the processors to determine a first point and a second point located on the hand of the user based at least in part on the gesture signal from the user detection system. The first point and the second point define a pointing direction of the hand of the user. The processors are also caused to calculate a virtual eye position based at least in part on a first point located on the hand of the user and the actual eye position. The processors are further caused to calculate a first target position based on the virtual eye position and a second target position based on the pointing position of the hand of the user. The first target position includes a first accuracy and the second target includes a second accuracy. The processors are caused to compare the first accuracy associated with the first target position with the second accuracy associated with the second target position. In response to determining the first accuracy is greater than the second accuracy, the processors are caused to select the first target position to be the final target position. In response to determining the second accuracy is greater than the first accuracy, the processors are caused to select the second target position as the final target position. Finally, the processors are caused to control at least one vehicle system based at least in part on the final target position.

In yet another embodiment, a method for determining a final target position that a user of a vehicle is gesturing towards is disclosed. The method includes determining, by a computer, a first point and a second point located on a hand of the user based at least in part on a gesture signal generated by a user detection system. The first point and the second point define a pointing axis of the hand of the user. The method also includes calculating a virtual eye position based at least in part on a first point located on the hand of the user and an actual eye position of the user, where an eye location signal generated by a user gaze monitoring system generates the actual eye position. The method also includes calculating, by the computer, a first target position based on the virtual eye position, where the first target position includes a first accuracy. The method further includes calculating, by the computer, a second target position based on the pointing axis of the hand of the user, where the second target position includes a second accuracy. The method also includes determining the final target position by selecting the first target position or the second target position based on the first target position and the second target position. Finally, the method includes controlling at least one vehicle system based at least in part on the final target position.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 6B illustrates the driver in FIG. 6A gesturing towards the center, according to one or more embodiments shown and described herein;

FIG. 6C illustrates the driver in FIG. 6A gesturing towards the right, according to one or more embodiments shown and described herein;

DETAILED DESCRIPTION

Figure 1:
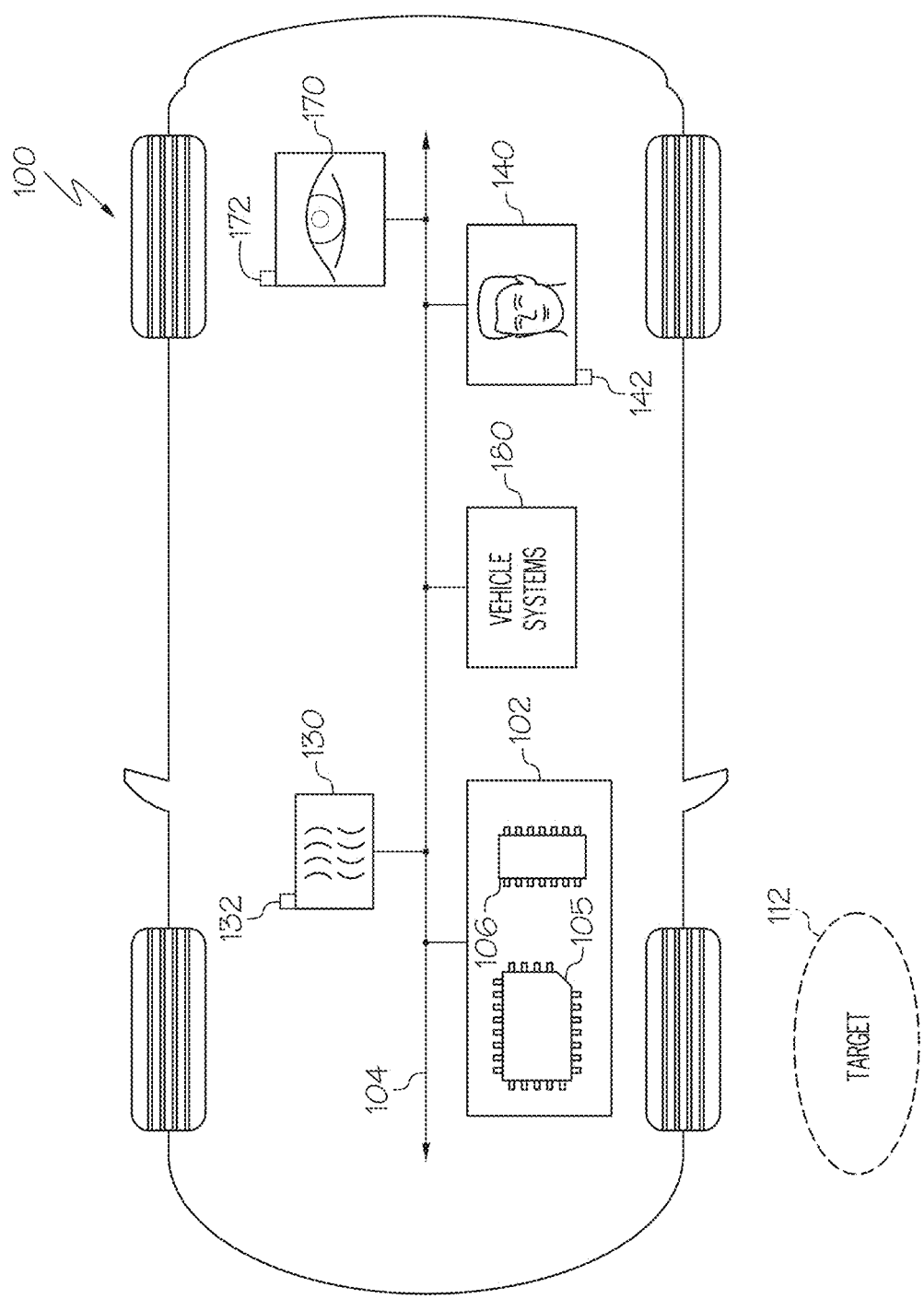
FIG. 1 depicts a schematic view of an example vehicle configured to determine a final target position based on a virtual eye position and a direction that a hand of a user is pointing towards, according to one or more embodiments shown and described herein.

The embodiments disclosed herein are directed to vehicle systems and methods to determine a target position that a user is pointing towards when his or her gaze is directed in a location other than the target position. In the embodiments as described in the present disclosure, the user is a driver of the vehicle. However, it should be appreciated that that the disclosure may also be applied towards a passenger of the vehicle as well.

When operating a vehicle, the driver normally directs his or her attention towards the environment located in front of the vehicle, and may turn his or her head momentarily to glance at objects located on either side of the vehicle. The driver may point or gesture towards a particular object or direction located in the surrounding using his or her hands, where the gesture may be used to convey information to one or more vehicle systems. For example, the driver may point towards a specific landmark, and the landmark is conveyed to a GPS or an interactive dialog system. However, since the driver is usually directing his or her attention towards the front of the vehicle, the direction of the driver's gaze may not align with the direction indicated by the hand.

The disclosed system determines a final target position that represents the position that the driver is attempting to gesture towards. More specifically, the disclosed system determines the final target position based on either a first target position or a second target position, where the first target position and the second target position are determined using different techniques.

The first target position is determined based on a simulated or virtual position of the driver's eyes. The virtual position of the driver's eyes is aligned with the target object and the tip of the driver's finger, and is used to determine the target position that the driver is pointing towards. As mentioned above, the driver is looking in a direction other than the target location (e.g., towards the front of the vehicle). The virtual eye position may be calculated by the location of the hand of the driver and the actual position of the driver's eyes. The location of the driver is determined based on a gesture signal that is generated by an object detection system. The system determines an actual position of the driver's eyes (i.e., the real position of the eyes) based at least in part on an eye location signal generated by a driver gaze monitoring system. The system then determines the virtual eye position by rotating the actual position of the driver's eyes about a vertical axis of the driver until a midpoint measured between the driver's eyes is aligned with the driver's fingertip. The position of the driver's eyes when aligned with the driver's fingertip represents the virtual eye position.

Once the virtual eye position is determined, the system may determine a directional vector that represents a virtual gaze position of the driver. The virtual gaze position is oriented towards the first target position. The first target position represents the target position calculated based on the virtual eye approach. The system also determines a directional vector pointing towards the second target position. The second target position is based on a pointing direction associated with the driver's hand. More specifically, the pointing direction indicates the direction that the driver's hand is gesturing towards. The system then calculates the final target position that the driver is gesturing towards by selecting either the first target position or the second target position.

An actual target position represents the real-life position of a location or object that the driver is attempting to gesture towards. The actual target position may be located at a right-hand side, a left-hand side, or a central position relative to the driver's body. For example, an object viewed through the driver's side window by the driver is located relative to the driver's left-hand side, an object viewed through the windshield by the driver is located relative to the central position, and an object viewed through the passenger side window is located on the driver's right-hand side.

The precision or accuracy of the pointing direction provided by the driver is based on the position of the actual target position and the particular hand the driver is using to perform a gesture (i.e., either the right hand or the left hand). More specifically, the accuracy of the pointing direction is greatest when the relative direction that the driver is gesturing towards is positioned in a location that is opposite to the specific hand that the driver uses to perform the gesture. For example, if the driver uses his or her right hand to point towards a target located relative to the driver's left-hand side, then the second target position indicated by driver's hand is more accurate when compared to the first target position based on the virtual gaze position. However, the accuracy associated with the second target position decreases in value as the direction of the driver's hand travels from the location opposite from the gesturing hand and towards the central portion of the vehicle 100.

It is to be appreciated that the accuracy of both the first target position and the second target position varies with respect to the position of the driver's hand. That is, the accuracy of both target position vary as the driver's hand travels between the right-hand side and the left-hand side. The system is configured to determine the final target position by selecting the target position that provides the greatest accuracy at a given position of the driver's hand.

Various embodiments of vehicles and methods for determining a target position that the user is gesturing towards are disclosed below.

Figure 5:
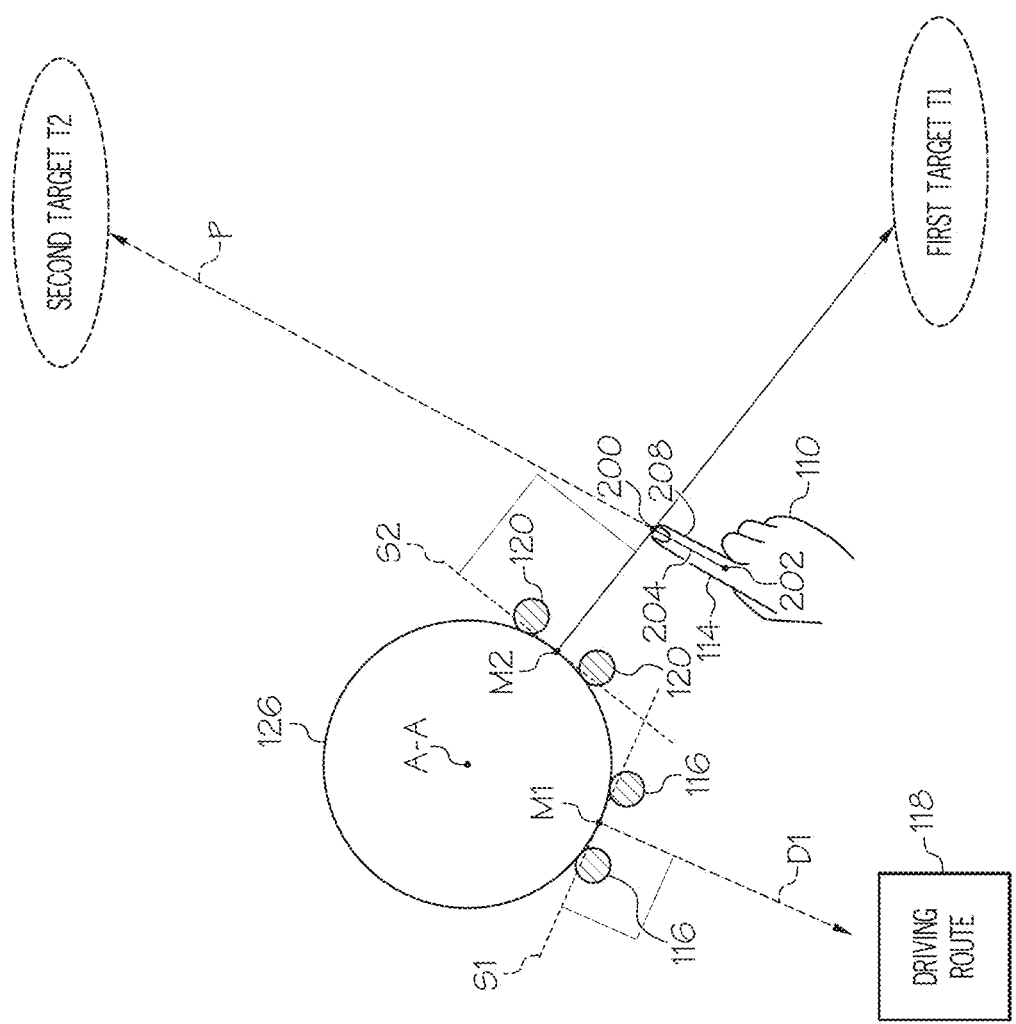
FIG. 5 depicts a schematic top view of the user and includes the first target position and a second target position, according to one or more embodiments shown and described herein.

Referring now to FIG. 1, an embodiment of a vehicle 100 is schematically depicted. The vehicle 100 may be any passenger vehicle such as, for example, a terrestrial, aquatic, and/or airborne vehicle. The vehicle 100 includes a communication path 104, an electronic control unit 102, an object detection system 130, a driver detection system 140, a driver gaze monitoring system 170 (which may also be referred to as a user gaze monitoring system), and one or more vehicle systems 180. The electronic control unit 102 includes one or more processors 105 and one or more memory modules 106. Referring to FIGS. 1 and 5, the electronic control unit 102 is configured to calculate a final target position 112 that is located in an environment surrounding the vehicle 100. The final target position 112 may represent an object that the driver is pointing at such as a person, an animal, a landmark, another vehicle, a building, and the like. The location represented by the final target position 112 represents where a driver of the vehicle 100 is attempting to point or gesture towards using his or her hand 110. The final target position 112 is selected from two discrete target locations, namely a first target location T1 and a second target location T2.

Referring to FIG. 1, the communication path 104 provides data interconnectivity between various modules disposed within the vehicle 100. Specifically, each of the modules may operate as a node that may send and/or receive data. In some embodiments, the communication path 104 includes a conductive material that permits the transmission of electrical data signals to processors, memories, sensors, and actuators throughout the vehicle 100. In some embodiments, the communication path 104 can be a bus, such as, for example, a LIN bus, a CAN bus, a VAN bus, and the like. In some embodiments, the communication path 104 may be wireless and/or an optical waveguide. Components that are communicatively coupled may include components capable of exchanging data signals with one another such as, for example, electrical signals via conductive medium, electromagnetic signals via air, optical signals via optical waveguides, and the like.

Accordingly, the communication path 104 may be formed from any medium that is capable of transmitting a signal such as, for example, conductive wires, conductive traces, optical waveguides, or the like. Moreover, the communication path 104 may be formed from a combination of mediums capable of transmitting signals. In some embodiments, the communication path 104 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

Still referring to FIG. 1, the electronic control unit 102 may be any computing device. For instance the electronic control unit 102 may be any type of vehicle-installed, handheld, laptop, or other form of single computing device, or may be composed of multiple computing devices. The electronic control unit 102 includes one or more processors 105 for controlling operations of the electronic control unit 102. The one or more processors 105 may include any device capable of executing machine-readable instructions stored on a non-transitory computer-readable medium. Accordingly, each of the one or more processors 105 may include a controller, an integrated circuit, a microchip, a computer, and/or any other computing device.

The electronic control unit 102 further includes one or more memory modules 106 communicatively coupled to the one or more processors 105. The one or more memory modules 106 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the electronic control unit 102 and/or external to the electronic control unit 102. The one or more memory modules 106 may be configured to store one or more pieces of logic as described in more detail below. The embodiments described herein may utilize a distributed computing arrangement to perform any portion of the logic described herein.

Embodiments of the present disclosure include logic that includes machine-readable instructions and/or an algorithm written in any programming language of any generation (e.g., 1GL, 2GL, 3GL, 4GL, and/or 5GL) such as, machine language that may be directly executed by the processor, assembly language, object-oriented programming (OOP), scripting languages, microcode, etc., that may be compiled or assembled into machine-readable instructions and stored on a machine-readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components. Logic stored on the one or more memory modules 106 may include, for example, object recognition logic, speech recognition logic, risk determination logic, notification generation logic, and autonomous vehicle control logic. Thus, the electronic control unit 102 includes logic to calculate the location of the final target position 112.

As noted above, the logic stored on the one or more memory modules 106 may include object recognition logic. The object recognition logic may include any known or yet-to-be-developed object recognition algorithms that may be utilized to detect objects within an environment. Example object recognition algorithms include, but are not limited to, edge detection algorithms, corner detection algorithms, blob detection algorithms, and feature description algorithms (e.g., scale-invariant feature transform ("SIFT"), speeded up robust features ("SURF"), gradient location and orientation histogram ("GLOH"), and the like). The logic stored on the electronic control unit may also include speech recognition logic used to detect the words spoken by the driver and/or passengers within the vehicle 100. Any known or yet-to-be-developed speech recognition algorithms may be used for the speech recognition logic.

In the embodiments described herein, the one or more memory modules 106 and the one or more processors 105 are integral with the electronic control unit 102. However, it is noted that the electronic control unit 102, the one or more memory modules 106, and the one or more processors 105 may be discrete components communicatively coupled to one another without departing from the scope of the present disclosure. As an example and not a limitation, one or more processors and one or more memory modules 106 of the electronic control unit 102 may be remote to the vehicle 100. For example, the vehicle 100 may be in wireless communication (e.g., using a wireless communication system) with a remote server storing logic and data that is configured to perform at least some of the functionalities described herein.

The object detection system 130 is communicatively coupled to the electronic control unit 102 over the communication path 104. The object detection system 130 may include any device configured to detect the presence of an object within the surrounding environment of the vehicle 100. More specifically, the object detection system 130 is configured to detect the presence of an object within the vicinity of the vehicle 100. The object detection system 130 may include an object detection sensor 132 configured to output an object signal indicative of the presence of one or more objects within the vicinity of the vehicle 100. Based on the object signal of the object detection sensor 132, the electronic control unit 102 may execute object recognition logic to detect an object and classify the detected object into a classification. The object detection sensor 132 may include, but is not limited to, a camera, a LiDAR sensor, a RADAR sensor, a sonar sensor, a proximity sensor, and the like. In some embodiments, the object detection system 130 includes more than one object detection sensor 132.

The driver detection system 140 is communicatively coupled to the electronic control unit 102 over the communication path 104. The driver detection system 140 may include any device configured to detect the presence, movements and/or actions of the driver of the vehicle 100. As such, the driver detection system 140 may include one or more driver detection sensors 142. The driver detection sensors 142 may include, but are not limited to, a camera with a field of view on a face and the surrounding area of the driver. Referring to FIGS. 1 and 5, the driver detection sensors 142 are configured to output a gesture signal that is indicative of a first point 200 located on the driver's hand 110. The gesture signal is created in response to the driver raising his or her hand 110 away from a steering wheel 144 of the vehicle 100 (FIG. 3) and attempt to point or otherwise draw attention to the second target position T2. That is, the gesture signal is created in response to the driver gesturing towards one or more objects using his or her hand 110.

Figure 2:
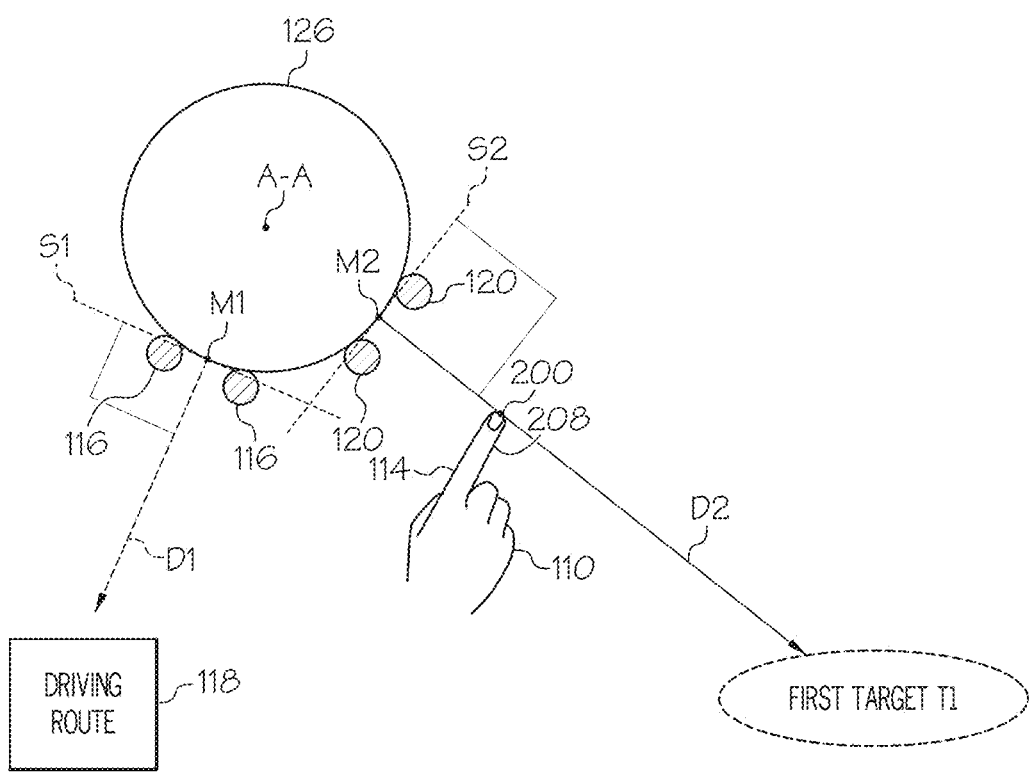
FIG. 2 depicts a schematic top view of a user of the vehicle pointing towards a first target position, according to one or more embodiments shown and described herein.
Figure 3:
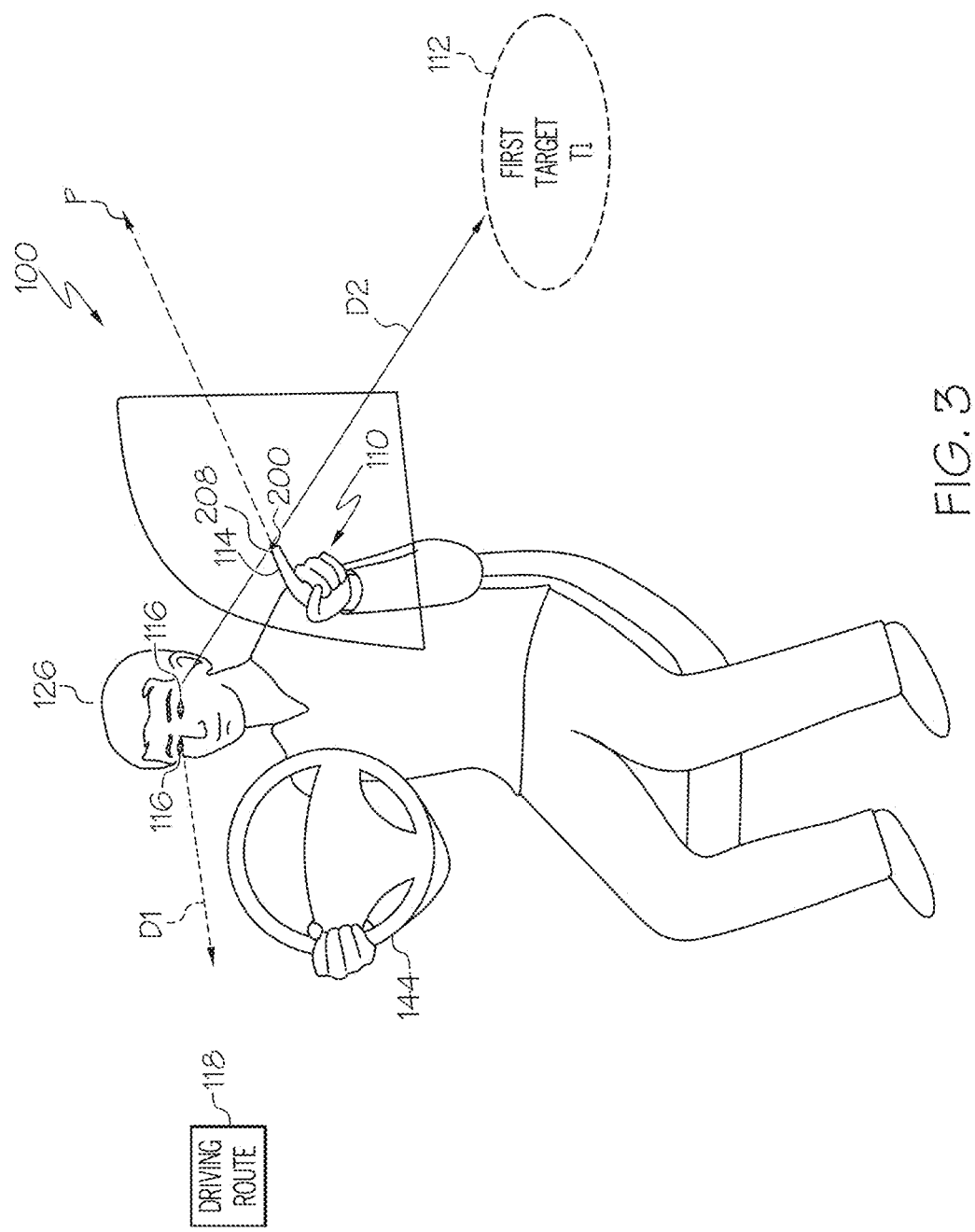
FIG. 3 is a perspective view of the user driving the vehicle and pointing towards the first target position, according to one or more embodiments shown and described herein.

In the exemplary embodiment as shown in FIGS. 2, 3 and 5, the first point 200 of the driver's hand 110 represents a tip 208 of a finger 114 located on the hand 110 of the driver. More specifically, the first point 200 is at the tip 208 of the driver's index finger 114. This is because the driver is gesturing towards the second target position T2 by pointing his or her index finger 114 along a pointing direction P. Accordingly, the electronic control unit 102 determines that the driver is pointing towards the second target position T2 using his or her hand 110, and sets the first point 200 as the tip 208 of the driver's index finger 114. Although the index finger 114 is described, it should be appreciated that the disclosure is not limited to gesturing towards the second target position T2 using an index finger of an individual. Instead, the driver may point using one or more digits of the hand 110 (e.g., the thumb, ring finger, etc.), where the tip of one or more digits of the user's hand 110 represent the first point 200.

In another embodiment, the first point 200 may not be located on the driver's hand 110. Instead, the driver may grasp an article or item with his or her hand. The driver may then use the object to point towards an object. For example, instead of using his or her index finger 114 the driver may point towards the second target position T2 using elongated articles such as a pen, a pencil, a stick, or the like. Therefore, the tip 208 of the driver's finger 114 is actually represented by an endpoint of the article that is being grasped by the driver. Specifically, a distal end of the article may be considered the tip 208 of the driver's finger 114. The distal end of the article points towards the second target position T2 (FIG. 5) and a proximate end of the article is grasped by the driver. Furthermore, although elongated objects such as pencils and pens are described, the disclosure is not limited to elongated object. The driver may also gesture using any other article that is sized to be grasped by the hand 110 of the driver, and can be manipulated to point towards a particular direction. For example, the article may be an item that the driver usually wears or keeps nearby while driving the vehicle 100 such as, but not limited to, a cellular telephone, a pair of sunglasses, and the like.

Referring to both FIGS. 1 and 2, the driver gaze monitoring system 170 is communicatively coupled to the electronic control unit 102 over the communication path 104. The driver gaze monitoring system 170 may include any device configured to monitor the driver's gaze associated movement. More specifically, the driver gaze monitoring system 170 includes one or more devices to monitor a direction and motion of the eyes 116 of the driver relative to his or her head 126. As such, the driver gaze monitoring system 170 may include one or more eye tracking systems 172 configured to output a direction signal indicative of the driver's gaze direction, which is referred to in FIG. 2 as D1. The eye tracking systems 172 may also output an eye location signal that indicates an actual position of the eyes 116 of the driver. As an example and not a limitation, the eye tracking system may include one or more cameras or some other optical sensors for detecting light reflected back from the driver's eyes. As a non-limiting example, the light reflected back from the driver's eyes may be near infrared light, which may range from about 700 nanometers to 2500 nanometers in the electromagnetic spectrum.

FIG. 2 is a schematic top view illustrating a head 126 and the hand 110 of the driver, where the driver is pointing towards the first target position T1. FIG. 3 is a perspective view of the driver gesturing towards the first target position T1 shown in FIG. 2. As seen in FIGS. 2 and 3, the driver is attempting to gesture towards the first target position T1 using one of the fingers 114 on his or her hand 110. The driver is pointing or gesturing in the pointing direction P (FIG. 3), however, the driver's gaze is directed towards the driver's gaze direction D1. The driver's gaze direction D1 is pointing towards a location that is different than the first target position T1. For example, the driver's gaze direction D1 is directed towards a driving route 118 of the vehicle 100.

Figure 6A:
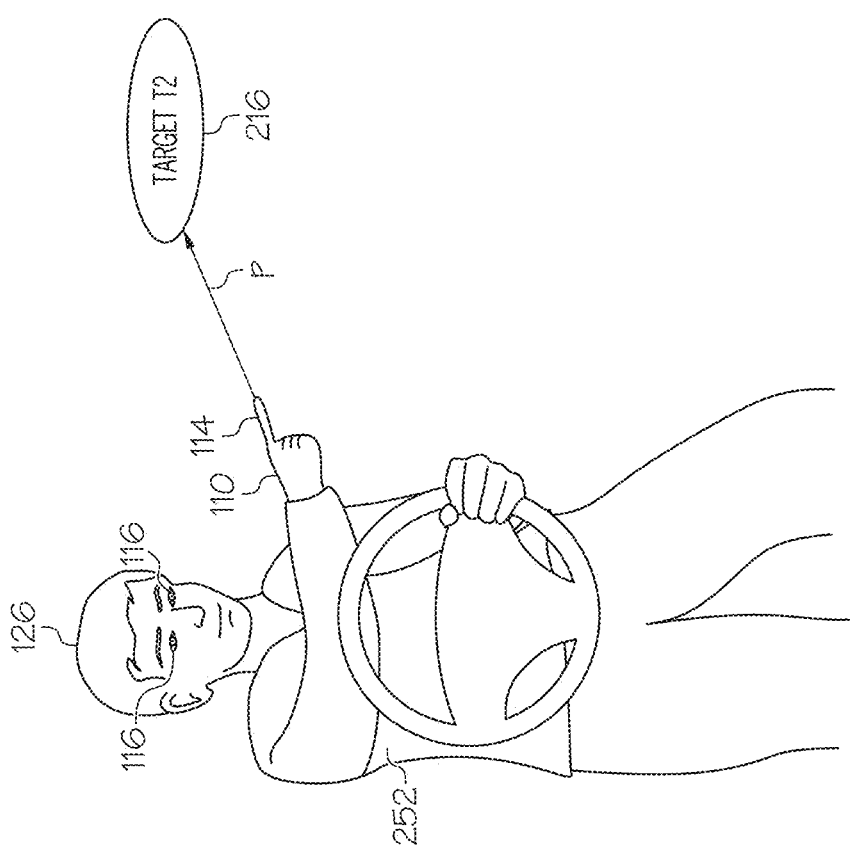
FIG. 6A illustrates the driver gesturing towards the left using his or her right hand, according to one or more embodiments shown and described herein.

Referring to FIGS. 1 and 5, both the first target position T1 as well as the second target position T2 are shown, where the second target position T2 is based on the direction indicated by the index finger 114 of the driver's hand 110 (i.e., the pointing direction P). As explained below, the electronic control unit 102 selects either the first target position T1 or the second target position T2 as the final target position 112 (FIG. 1). The selection of either the first target position T1 or the second target position T2 is based at least in part on a location associated with an actual target position 216 (FIG. 6A-6C) and the particular hand 110 that the driver uses to gesture with (i.e., either the right hand or the left hand). More specifically, as seen in FIGS. 6A-6C and described in greater detail below, the driver may gesture in the pointing direction P towards either a left-hand side of the driver's body 252 (FIG. 6A), a central area of the body 252 (FIG. 6B), or a right-hand side of the body 252 (FIG. 6C). It should be appreciated that the left and right-hand sides are illustrated in FIGS. 6A and 6C on opposite sides (e.g., the driver appears to be pointing right in FIG. 6A) because of the relative orientation of the vehicle 100.

Calculation of the first target position T1 (FIG. 2) based on the virtual eye position will now be described. Referring to both FIGS. 1 and 2, in response to receiving the eye location signal from the eye tracking systems 172, the electronic control unit 102 determines the position of the eyes 116 of the driver. The electronic control unit 102 then calculates a midpoint M1 between the two eyes 116 of the driver. More specifically, as seen in FIG. 2 the electronic control unit 102 calculates the midpoint M1 by determining a first line segment S1 relative to the driver's head 126. The first line segment S1 intersects both eyes 116 of the driver, is tangent with respect to the driver's head 126, and is substantially perpendicular with respect to the vector representing the driver's gaze direction D1. The midpoint M1 represents a middle point between the two eyes 116 of the driver that intersects the first line segment S1.

In the embodiment as shown in FIG. 2, the driver's head 126 is drawn as a circle for purposes of simplicity and clarity in the illustration. However, it should be appreciated that the illustration shown in FIG. 2 is not limiting. The electronic control unit 102 may calculate the line segment S1 and the midpoint M1 by modeling the driver's head using any number of shapes or profiles.

The electronic control unit 102 may then calculate the virtual eye position, which represents a simulated or virtual position of the driver's eyes. As seen in FIG. 2, a set of virtual eyes 120 of the driver is shown. The virtual eyes 120 are directed towards the first point 200 on the driver's hand 110. That is, FIG. 2 illustrates the pair of virtual eyes 120 directed towards the tip 208 of the finger 114. The electronic control unit 102 may calculate the position of the set of virtual eyes 120 by rotating the actual position of the driver's eyes 116 about a vertical axis A-A of the head 126 of the driver until the midpoint M1 measured between the driver's eyes 116 is aligned with the first point 200 located at the tip 208 of the driver's finger 114 when viewed in a plane substantially perpendicular to the axis A-A of the driver (i.e., a horizontal plane). In other words, the electronic control unit 102 simulates the driver turning his or her head 126 such that the virtual eyes 120 are positioned to see the first target position T1. It should be appreciated that the vertical axis A-A of the driver's head 126 represents the vertical axis of the driver's body 252. The vertical extends from the head to the feet of a human's body. Furthermore, it should be understood that humans are capable of rotating about their respective vertical axis to perform a three hundred and sixty degree turn.

Figure 4:
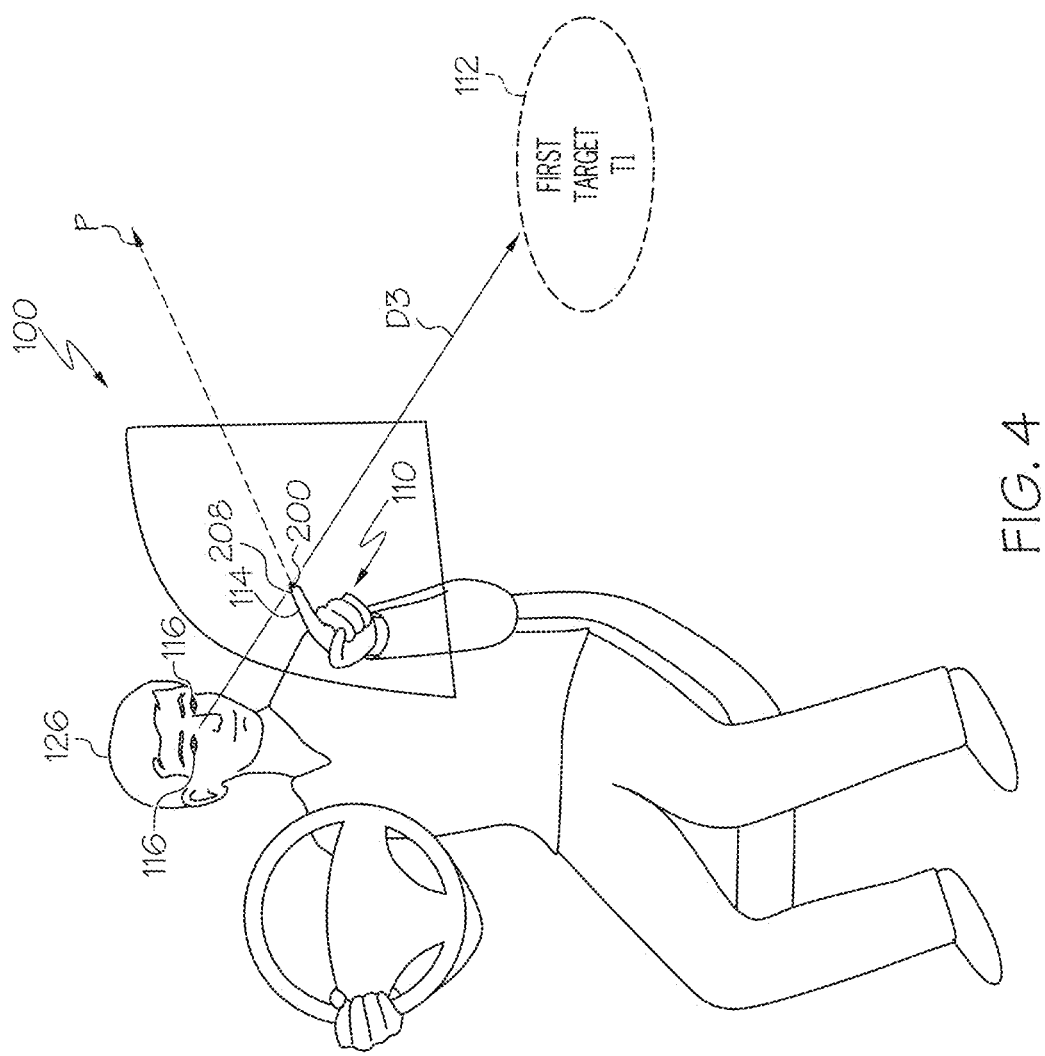
FIG. 4 is a perspective view of the user pointing towards the object and also directing his or her gaze towards the first target position, according to one or more embodiments shown and described herein.

FIG. 4 illustrates the driver directing his or her gaze towards the first target position T1 while also pointing in the pointing direction P. In other words, the driver has turned his or her head 126 such that his or her eyes 116 are aligned with the first target position T1. More specifically, the driver's eyes 116 are directed towards a third gaze direction D3 that is aligned with the tip 208 of the driver's finger 114 and is directed towards the first target position T1. Therefore, the driver is indicating the general direction of the first target position T1 by pointing his or her finger 114 towards the direction P. The driver is also gazing past the tip 208 of his or her finger 114 towards the first target position T1.

Turning back to FIGS. 2 and 3, a midpoint between the virtual eyes 120 of the driver is indicated as midpoint M2. The electronic control unit 102 calculates the midpoint M2 by first determining a second line segment S2 relative to the driver's head 126. The second line segment S2 intersects both of the virtual eyes 120 and is tangent with respect to the driver's head 126. The midpoint M2 represents a middle point between the two virtual eyes 120 that intersect the second line segment S2. In response to determining the midpoint M2 between the virtual eyes 120, the electronic control unit calculates a virtual gaze direction D2 of the driver. The electronic control unit 102 calculates the virtual gaze direction D2 by determining a vector that originates at the midpoint M2 and intersects the first point 200 of the driver's hand 110. As seen in FIG. 2, the vector is substantially perpendicular with respect to the second line segment S2.

It should be appreciated that the virtual gaze direction D2 represents a simulated gaze direction of the driver, where the driver is looking towards the first target position T1. That is, the driver's head 126 is turned such that the eyes 116 would be directed towards the first target position T1. More specifically, the virtual gaze direction D2 of FIG. 2 is the same as the third gaze direction D3 illustrated in FIG. 3. The third gaze direction D3 is aligned with the tip 208 of the driver's finger 114 and is directed towards the first target position T1.

Referring back to FIG. 1, the electronic control unit 102 determines one or more objects based on the object signal that intersects with the vector representing the virtual gaze direction D2, and identifies the object that intersects with the vector as the first target position T1. The electronic control unit 102 may execute object recognition logic to classify the object. In one embodiment, the electronic control unit 102 may employ the object recognition logic configured to recognize specific landmarks. Some examples of landmarks that may be recognized include, but are not limited to, the Golden Gate Bridge in San Francisco, the Empire State Building in New York City, the Eiffel Tower in Paris, and the like.

Calculation of the second target position T2 based on the position of the driver's hand 110 will now be described. Referring to both FIGS. 1 and 5, the electronic control unit 102 receives as input the gesture signal generated by the driver detection sensors 142. The gesture signal indicates at least two points located on the driver's hand 110. More specifically, the gesture signal indicates the first point 200 as well as a second point 202, where both points 200, 202 are located along the finger 114 of the driver's hand 110. As mentioned above, the first point 200 is located at the tip 208 of the driver's finger 114. The second point 202 is located along the driver's finger 114, at a location below the tip 208, and is collinear with respect to the first point 200. The points 200, 202 define a line segment 204, where the line segment 204 represents a pointing axis of the driver's finger 114. The pointing axis indicates the direction that the driver's hand 110 is pointing or gesturing towards. More specifically, in the embodiment as illustrated in FIG. 5 the pointing axis (i.e., the line segment 204) is aligned with the driver's index finger 114. The electronic control unit 102 then extends the line segment 204 representing the pointing axis beyond the tip 208 of the driver's finger 114 to determine a vector that represents the pointing direction P.

The electronic control unit 102 then determines one or more objects based on the object signal generated by the object detection system 130 and the vector representing the pointing direction P. More specifically, the object or objects indicated by the object signal that intersect with the vector representing the second target position T2 are the second target position T2. Once the first target position T1 and the second target position T2 are calculated, the electronic control unit 102 may then determine the final target position 112.

The selection of either the first target position T1 based on the virtual gaze direction D2 or the second target position T2 based on the pointing direction P will now be described, where the selected target position is set as the final target position 112. Referring to FIGS. 1, 5, and 6A-6C, the accuracy of the second target position T2 is the greatest when the driver is gesturing towards the left-hand side of the driver's body 252 with his or her right hand 110, which is illustrated in FIG. 6A. That is, the accuracy of the pointing direction P towards the second target position T2 is greatest when the relative direction that the driver is gesturing towards with his or her hand 110 is positioned opposite to the specific hand 110 that the driver is gesturing with. For example, in the embodiment as shown in FIG. 6A the second target position T2 is positioned in about the same location as the actual target position 216. Although FIG. 6A illustrates the driver pointing towards the left-hand side of the body 252 using his or her right hand 110, it should be appreciated that a similar result will occur when the driver gestures towards the right-hand side of the body 252 using his or her left hand 110.

Referring now to FIGS. 1, 5, and 6B, the accuracy of the second target position T2 as the driver gestures with his or her hand 110 towards the central portion of the driver's body 252 may decrease relative to the position shown in FIG. 6A (i.e., where the driver gestures to the left-hand side using the right hand 110). Indeed, the second target position T2 is no longer located in about the same position as the actual target position 216 in FIG. 6B. Furthermore, the accuracy of the target position T2 as the driver gestures with his or her hand 110 towards the right-hand side of the body 252 may also decrease with respect to the position shown in FIG. 6A. In the non-limiting embodiment as shown in FIGS. 6B and 6C, the configuration shown in FIG. 6C is more accurate than the configuration shown in FIG. 6B. That is, the driver gestures towards the second target position T2 with the least amount of accuracy when the pointing direction P of the hand 110 is oriented towards the central portion of the driver's body 252. As seen in FIG. 6B, a right arm 260 of the driver tends to be constricted in movement when gesturing towards the central portion. This may be due to the fact that a human's skeleton tends to be restricted in movement when the arm moves backwards, which makes it more difficult for a human to gesture in the central position.

Although FIGS. 6B and 6C illustrate the driver gesturing with the least amount of accuracy when the pointing direction P is directed towards the central position (FIG. 6B), it is to be appreciated that the embodiment is not limiting in nature. For instance, in another embodiment the accuracy of the second target position T2 as seen in FIG. 6B is greater than the accuracy of the second target position T2 that is illustrated in FIG. 6C. However, the difference in accuracy between the driver gesturing in the central position and the right-hand side of the body 252 is not as significant as the differences in accuracy when comparing the embodiments shown in either FIG. 6B or FIG. 6C with the embodiment as shown in FIG. 6A (where the driver gestures towards the left-hand side of the body 252).

Referring to FIGS. 1, 5, and 6A-6B, the electronic control unit 102 selects the second target position T2 to be the final target position 112 in response to determining that the relative direction of the pointing direction P of the right hand is aimed towards the left-hand direction relative to the body 252 of the driver. More specifically, the electronic control unit 102 determines a lateral side of the body 252 that is connected to the hand 110 based on the gesture signal generated by the driver detection sensors 142. For example, in the embodiment as shown in FIG. 6A, the hand 110 is connected to the right lateral side of the body 252 of the driver.

The electronic control unit 102 then compares the relative direction that the pointing direction P is aimed towards with the lateral side of the body 252 connected to the hand 110 of the driver. In response to determining that the relative direction of the pointing direction P is aimed opposite the lateral side of the body 252 that is connected to the hand 110, the electronic control unit 102 selects the second target position T2 as the final target position 112. For example, in the embodiment as shown in FIG. 6A, the electronic control unit 102 determines the pointing direction P is aimed towards the left-hand side relative to the body 252 of the driver, and the hand 110 of the driver is connected to a right-hand side of the body 252. Thus, the second target position T2 is selected by the electronic control unit 102 as the final target position 112.

Similarly, in response to determining that the relative direction of the pointing direction P is aimed away from the lateral side of the body 252 of the driver that is connected to the hand 110, then the electronic control unit 102 selects the first target position T1 as the final target position 112. For example, in the embodiment as shown in FIG. 6C, the electronic control unit 102 determines the pointing direction P is aimed towards the right-hand side of the driver's body 252, and the hand 110 of the driver is connected to the right-hand side of the body 252 of the driver. Thus, the first target position T1 is selected by the electronic control unit 102 as the final target position 112.

Figure 7:
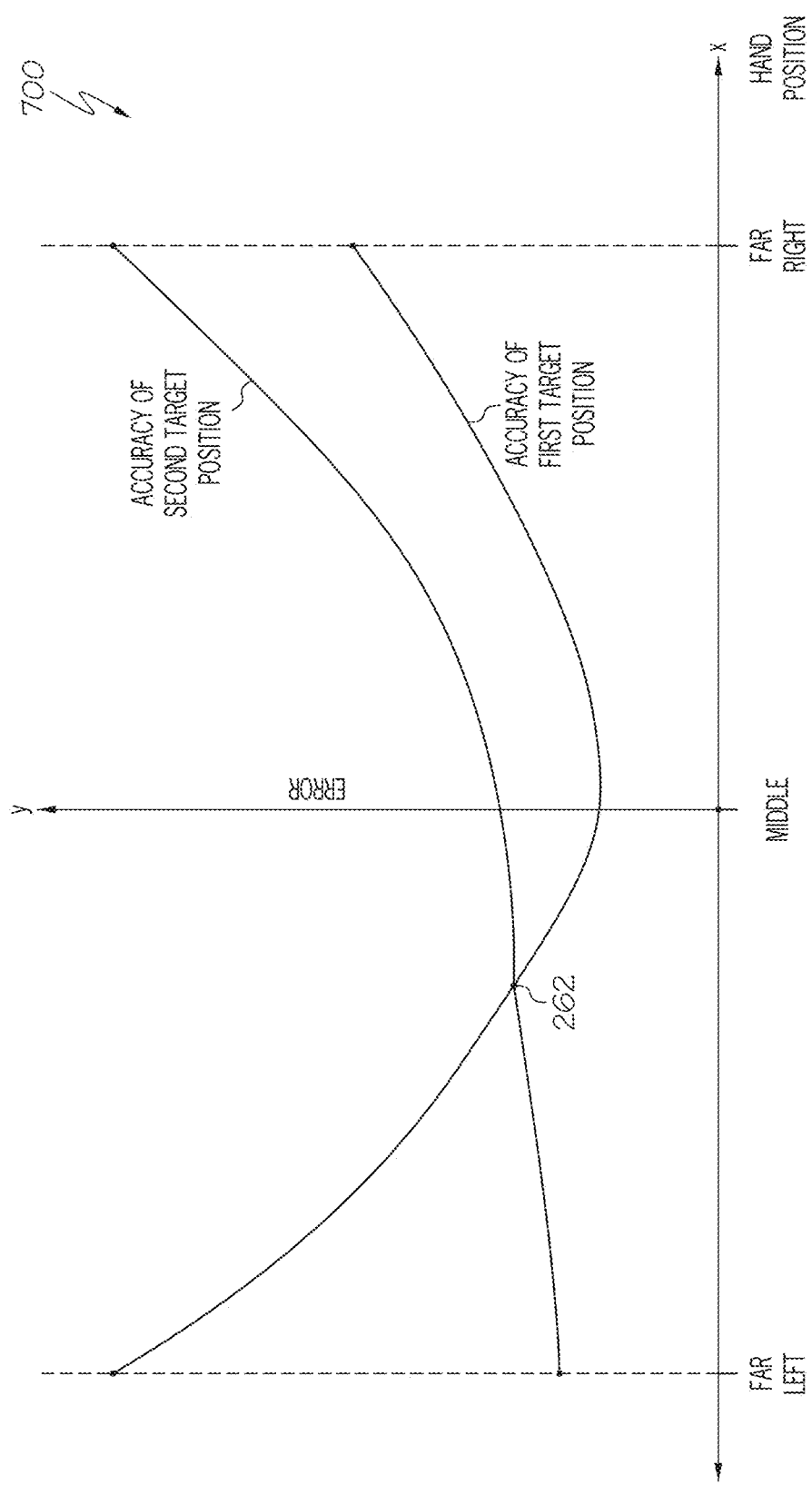
FIG. 7 depicts a graph illustrating an accuracy associated with the first target position and an accuracy associated with the second target position, according to one or more embodiments shown and described herein.

FIG. 7 is an exemplary graph 700 illustrating a hypothetical error of the first target position T1 (which is based on the virtual eye position) and the second target position T2 (which is based on the pointing direction P). The x-axis of the graph 700 represents the position of the driver's hand 110 (FIG. 6A-6C), and the y-axis represents error. In the exemplary embodiment as shown, the driver is using his or her right hand 110 to gesture towards the target. The graph includes a line that represents a first accuracy associated with the first target position T1 and another line that represents a second accuracy associated with a second accuracy of the second target position T2.

Referring to FIGS. 5, 6A-6C, and 7, the first accuracy associated with the first target position T1 is less than the second accuracy associated with the second target position T2 when the driver is gesturing as far to the right as possible. However, as seen in FIG. 7, the second accuracy of the second target position T2 decreases until the driver's right hand 110 is gesturing towards the central portion of the driver's body 252. The second accuracy of the second target position T2 remains relatively static as the direction of the driver's right hand 110 gestures further to the left-hand side.

The first accuracy associated with the first target position T1 decreases in value as the direction of the driver's right hand gestures from the far right towards the central portion of the driver's body 252. As seen in FIG. 7, the first accuracy of the first target position T1 is at a minimum value when the user is pointing directly towards the middle. The first accuracy of the first target position T1 increases in value as the driver gestures further towards the left-hand side. Furthermore, the first accuracy of the first target position T1 is at a maximum when the driver gestures towards the far left.

Although the driver's right hand side is described as gesturing towards the second target position T2, it should be appreciated that the following concepts may also apply when the driver uses his or her left hand as well. However, the magnitude of the first and second accuracies (FIG. 7) are switched such that the first accuracy associated with the first target position T1 is at a maximum value when the driver is gesturing to the far right, and the second accuracy associated with the second target position is greater than the first target position when the driver gestures towards the far left.

Referring to FIGS. 1, 5 and 7, the first accuracy associated with the first target position T1 and the second accuracy associated with the second target position T2 are usually unequal with respect to one another. In other words, the accuracies associated with the first target and the second target positions tend to be dissimilar with respect to another. Thus, the electronic control unit 102 selects the first target position T1 as the final target position 112 in response to determining the first accuracy is greater than the second accuracy. Similarly, the electronic control unit 102 selects the second target position T2 as the final target position 112 in response to determining the second accuracy is greater than the first accuracy. However, as seen in FIG. 7, the line segments associated with first and second accuracies cross one another at the position 262. Thus, the values of the first accuracy and the second accuracy are equal. In the event the first accuracy is equal to the second accuracy, then the electronic control unit 102 may select either value as the final target position 112.

Referring to FIGS. 1 and 5, once the final target position 112 is determined the electronic control unit 102 may then communicate the virtual gaze direction D2, the final target position 112, and the object classified using object recognition logic to one or more vehicle systems 180 via the communication path 104. The vehicle systems 180 may be controlled based on at least one of the virtual gaze direction D2, the final target position 112, and the object classified using object recognition logic. The vehicle systems 180 may include, but are not limited to, a GPS system or an interactive dialog system. An interactive dialog system converses with the driver using text, speech, gestures, haptics, and the like. In one embodiment, the interactive dialog system may assist the driver with identifying objects located in the final target position 112. For example, if the driver points towards the Empire State Building in New York City and asks "What am I pointing to?", then the interactive dialog system would answer back "The Empire State Building".

Figure 8:
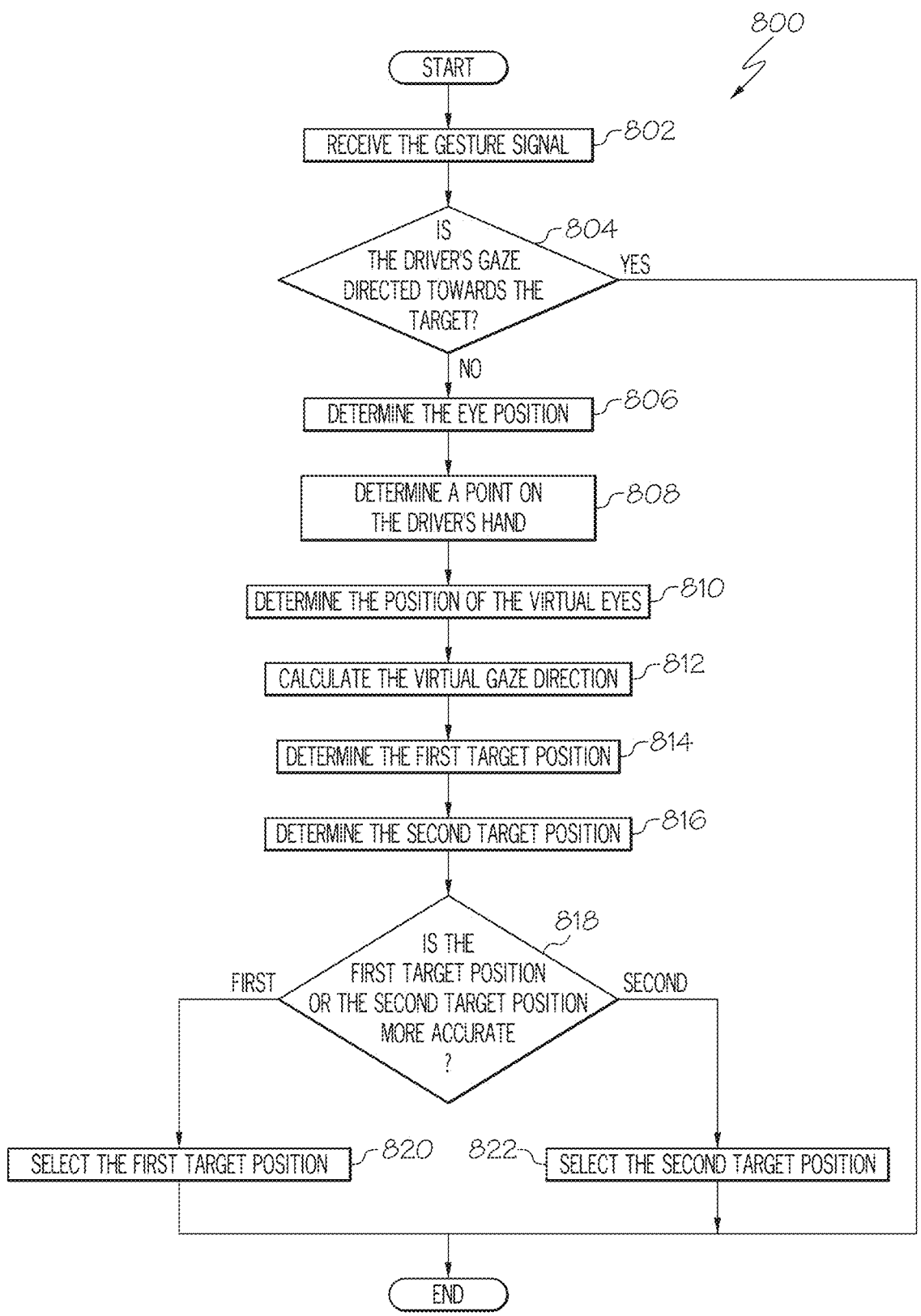
FIG. 8 is a flowchart of an example method for determining the final target position, according to one or more embodiments shown and described herein.

Referring now to FIG. 8, a flowchart 800 depicting a method for determining the final target position 112 is graphically depicted. As explained above, the final target position 112 is based on the virtual eye position as well as the direction that the driver points towards using his or her hand 110. It should be understood that embodiments are not limited by the order of steps of the flowchart 800 of FIG. 8.

Referring generally to FIGS. 1, 2, 3, and 8, in block 802 of the flowchart 800 the electronic control unit 102 receives the gesture signal generated by the driver detection system 140. The gesture signal indicates that the driver is raising his or her hand 110 away from the steering wheel 144 of the vehicle 100 to point or otherwise draw attention to an object or a position located within the environment surrounding the vehicle 100. The method may then proceed to decision block 804.

In decision block 804, the electronic control unit 102 determines if the driver's gaze is directed towards the final target position 112. More specifically, the electronic control unit 102 determines if the driver's gaze direction D1 is directed towards the final target position 112 based on the direction signal generated by the driver gaze monitoring system 170 and the first point 200 on the driver's hand 110. If the driver's gaze direction D1 intersects the first point 200, then the electronic control unit 102 determines that the driver's gaze direction D1 is directed towards the final target position 112. The method may then terminate. However, if the electronic control unit 102 determines that the driver's gaze direction D1 does not intersection the first point 200 on the driver's hand 110, then the method may proceed to block 806.

In block 806, the electronic control unit 102 determines the position of the driver's eyes 116 (FIG. 2) based on the eye location signal generated by the driver gaze monitoring system 170. The method may then proceed to block 808.

In block 808, the electronic control unit 102 determines the first point 200 on the driver's hand 110 (FIG. 2) based on the gesture signal generated by the driver detection system 140. In the embodiment as illustrated, the first point 200 represents the tip 208 of the driver's index finger 114. However, as explained above, the disclosure is not limited to the driver's index finger 114. In fact, the first point 200 may be an object that the driver grasps in his or her hand such as a pen, a pencil, a pair of sunglasses, and the like. The method may then proceed to block 810.

In block 810, the electronic control unit 102 determines the position of the virtual eyes 120. Referring to FIG. 2, the virtual eyes 120 are calculated by rotating the actual position of the driver's eyes 116 about the vertical axis A-A of the driver's head 126 until the midpoint M1 measured between the driver's eyes 116 is aligned with the first point 200 of the driver's finger 114. The method may then proceed to block 812.

In block 812, the electronic control unit 102 calculates the virtual gaze direction D2 by determining a vector that originates at the midpoint M2 and intersects the first point 200 of the driver's hand 110. The method may then proceed to block 814.

In block 814, the electronic control unit 102 determines the second target position T2 based on the pointing direction P. In some embodiments, the electronic control unit 102 may also determine one or more objects based on the object signal generated by the object detection system 130 and the vector representing the pointing direction P. More specifically, the object or objects indicated by the object signal that intersect with the vector as the second target position T2 may represent the second target position T2. The method may then proceed to block 816.

In block 816, the electronic control unit 102 determines the second target position T2 as seen in FIG. 5. The second target position T2 is determined based on the pointing direction P that indicates the direction that the driver is gesturing towards. More specifically, as seen in FIG. 5 the pointing direction P is collinear with respect to the pointing axis of the driver's finger 114 (the pointing axis is illustrated in FIG. 5 as the line segment 204). The method may then proceed to decision block 818.

In block 818, the electronic control unit 102 compares the first accuracy of the first target position T1 and the second accuracy of the second target position T2. In response to determining that the first accuracy is greater than the second accuracy, the method may proceed to block 820. In block 820, the electronic control unit 102 selects the first target position T1 as the final target position 112. The method may then terminate.

In the event the electronic control unit 102 determines that the second accuracy is greater than the first accuracy, the method may proceed to block 820. In block 820, the electronic control unit 102 selects the second target position T2 as the final target position 112. The method may then terminate.

It should now be understood that embodiments described herein are directed to vehicle systems that determine a target position that a driver or passenger of the vehicle is attempting to point or otherwise gesture towards. More specifically, the disclosed system determines the final target position by selecting either the first target position or the second target position, where the target associated with the greatest accuracy is selected. The disclosed system takes into account the position of the target, the position of the driver's hand with respect to the target, and the particular hand that the driver may use to point towards a target (i.e., the right hand or the left hand). Thus, the disclosed system accounts for limitations in a driver's ability to move his or her body in order to point towards an object while seated in the vehicle. For example, the skeleton of a human tends to be restricted in movement when the arm moves backwards, which in turn may affect the accuracy when the driver attempts to gesture towards a central location. The disclosed system takes advantage of the fluctuations in accuracy by selecting the target position having the greatest accuracy as the final target position.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A vehicle, comprising:
   a user detection system configured to output a gesture signal in response to a hand of a user performing at least one gesture to indicate a final target position;
   a user gaze monitoring system configured to output an eye location signal that indicates an actual eye position of the user;
   one or more processors; and
   one or more non-transitory memory modules communicatively coupled to the one or more processors and storing machine-readable instructions that, when executed, cause the one or more processors to perform at least the following:
   determine a first point and a second point located on the hand of the user based at least in part on the gesture signal from the user detection system, wherein the first point and the second point define a pointing direction of the hand of the user;
   calculate a virtual eye position based at least in part on the first point located on the hand of the user and the actual eye position;
   calculate a first target position based on the virtual eye position, wherein the first target position includes a first accuracy;
   calculate a second target position based on the pointing direction of the hand of the user, wherein the second target position includes a second accuracy;
   select either the first target position or the second target position as the final target position based on the first accuracy and the second accuracy; and
   control at least one vehicle system based at least in part on the final target position.

2. The vehicle of claim 1, wherein the machine-readable instructions further cause the one or more processors to:
   determine a midpoint measured between a pair of virtual eyes; and
   determine a vector that originates at the midpoint and intersects the first point located on the hand of the user, wherein the vector represents a virtual gaze direction of the user.

3. The vehicle of claim 2, wherein the machine-readable instructions further cause the one or more processors to:
   determine a presence of an object located in an environment surrounding the vehicle that intersects with the vector representing the virtual gaze direction; and
   identify the object that intersects with the vector as the first target position.

4. The vehicle of claim 1, wherein the machine-readable instructions further cause the one or more processors to:
   determine a vector by extending a line segment representing a pointing axis beyond the hand of the user, wherein the pointing direction is determined based on the pointing axis;
   determine a presence of an object located in an environment surrounding the vehicle that intersects with the vector representing the pointing direction; and
   identify the object that intersects with the vector as the second target position.

5. The vehicle of claim 1, wherein the machine-readable instructions further cause the one or more processors to:
   compare the first accuracy associated with the first target position with the second accuracy associated with the second target position;
   in response to determining the first accuracy is greater than the second accuracy, select the first target position to be the final target position; and
   in response to determining the second accuracy is greater than the first accuracy, select the second target position as the final target position.

6. The vehicle of claim 1, wherein the machine-readable instructions further cause the one or more processors to:
   determine a lateral side of a body that is connected to the hand of the user based on the gesture signal; and
   determine the second accuracy associated with the second target position based on the lateral side of the body that is connected to the hand of the user, the pointing direction of the hand, and the second target position.

7. The vehicle of claim 6, wherein the machine-readable instructions further cause the one or more processors to:
   determine a relative direction of the pointing direction with respect to the body of the user;
   compare the relative direction of the pointing direction with the lateral side of the body that is connected to the hand of the user; and
   in response to determining that the relative direction of the pointing direction is aimed opposite of the lateral side of the body that is connected to the hand of the user, select the second target position as the final target position.

8. The vehicle of claim 6, wherein the machine-readable instructions further cause the one or more processors to:

determine a relative direction of the pointing direction with respect to the body of the user;
compare the relative direction of the pointing direction with the lateral side of the body that is connected to the hand of the user; and
in response to determining that the relative direction of the pointing direction is aimed towards the lateral side of the body that is connected to the hand of the user, select the first target position as the final target position.

9. The vehicle of claim 1, wherein the machine-readable instructions further cause the one or more processors to:
determine that the user is pointing towards the second target position by the hand, wherein the hand includes a plurality of digits that each define a respective tip; and
set the first point located on the hand of the user to the respective tip of a digit.

10. The vehicle of claim 1, wherein the machine-readable instructions further cause the one or more processors to:
determine that the user is pointing towards the second target position by an article defining a proximate end and a distal end, wherein the user grasps the proximate end of the article with the hand and the distal end of the article is directed towards the second target position; and
set the first point located on the hand of the user as the distal end of the article.

11. A vehicle, comprising:
a user detection system configured to output a gesture signal in response to a hand of a user performing at least one gesture to indicate a final target position;
a user gaze monitoring system configured to output an eye location signal that indicates an actual eye position of the user;
one or more processors; and
one or more non-transitory memory modules communicatively coupled to the one or more processors and storing machine-readable instructions that, when executed, cause the one or more processors to perform at least the following:
determine a first point and a second point located on the hand of the user based at least in part on the gesture signal from the user detection system, wherein the first point and the second point define a pointing direction of the hand of the user;
calculate a virtual eye position based at least in part on the first point located on the hand of the user and the actual eye position;
calculate a first target position based on the virtual eye position, wherein the first target position includes a first accuracy;
calculate a second target position based on the pointing direction of the hand of the user, wherein the second target position includes a second accuracy;
compare the first accuracy associated with the first target position with the second accuracy associated with the second target position;
in response to determining the first accuracy is greater than the second accuracy, select the first target position to be the final target position;
in response to determining the second accuracy is greater than the first accuracy, select the second target position as the final target position; and
control at least one vehicle system based at least in part on the final target position.

12. The vehicle of claim 11, wherein the machine-readable instructions further cause the one or more processors to:
determine a midpoint measured between a pair of virtual eyes; and
determine a vector that originates at the midpoint and intersects the first point located on the hand of the user, wherein the vector represents a virtual gaze direction of the user.

13. The vehicle of claim 12, wherein the machine-readable instructions further cause the one or more processors to:
determine a presence of an object located in an environment surrounding the vehicle that intersects with the vector representing the virtual gaze direction; and
identify the object that intersects with the vector as the first target position.

14. The vehicle of claim 12, wherein the machine-readable instructions further cause the one or more processors to:
determine a vector by extending a line segment representing a pointing axis beyond the hand of the user, wherein the pointing direction is based on the pointing axis;
determine a presence of an object located in an environment surrounding the vehicle that intersects with the vector representing the pointing direction; and
identify the object that intersects with the vector as the second target position.

15. The vehicle of claim 12, wherein the machine-readable instructions further cause the one or more processors to:
determine a lateral side of a body that is connected to the hand of the user based on the gesture signal; and
determine the second accuracy associated with the second target position based on the lateral side of the body that is connected to the hand, the pointing direction of the hand, and the second target position.

16. The vehicle of claim 15, wherein the machine-readable instructions further cause the one or more processors to:
determine a relative direction of the pointing direction with respect to the body of the user;
compare the relative direction of the pointing direction with the lateral side of the body that is connected to the hand of the user; and
in response to determining that the relative direction of the pointing direction is aimed opposite of the lateral side of the body that is connected to the hand of the user, select the second target position as the final target position.

17. The vehicle of claim 11, wherein the machine-readable instructions further cause the one or more processors to:
determine a relative direction of the pointing direction with respect to the body of the user;
compare the relative direction of the pointing direction with the lateral side of the body that is connected to the hand of the user; and
in response to determining that the relative direction of the pointing direction is aimed towards the lateral side of the body that is connected to the hand of the user, select the first target position as the final target position.

18. A method of determining a final target position that a user of a vehicle is gesturing towards, the method comprising:
determining, by a computer, a first point and a second point located on a hand of the user based at least in part on a gesture signal generated by a user detection system, wherein the first point and the second point define a pointing direction of the hand of the user;
calculating a virtual eye position based at least in part on the first point located on the hand of the user and an actual eye position of the user, wherein an eye location signal generated by a user gaze monitoring system generates the actual eye position;

calculating, by the computer, a first target position based on the virtual eye position, wherein the first target position includes a first accuracy;

calculating, by the computer, a second target position based on the pointing direction of the hand of the user, wherein the second target position includes a second accuracy;

selecting either the first target position or the second target position as the final target position based on the first accuracy and the second accuracy; and controlling at least one vehicle system based at least in part on the final target position.

19. The method of claim 18, further comprising:

determining a lateral side of a body of the user that is connected to the hand based on the gesture signal;

determining a relative direction of the pointing direction with respect to the body of the user;

comparing the relative direction of the pointing direction with the lateral side of the body that is connected to the hand of the user; and in response to determining that the relative direction of the pointing direction is aimed opposite of the lateral side of the body that is connected to the hand of the user, selecting the second target position as the final target position.

20. The method of claim 18, further comprising:

determine a lateral side of a body of the user that is connected to the hand based on the gesture signal;

determining a relative direction of the pointing direction with respect to the body of the user;

comparing the relative direction of the pointing direction with the lateral side of the body that is connected to the hand of the user; and in response to determining that the relative direction of the pointing direction is aimed towards the lateral side of the body of the user that is connected to the hand, selecting the first target position as the final target position.

* * * * *

UNITED STATES PATENT AND TRADEMARK OFFICE
CERTIFICATE OF CORRECTION

PATENT NO. : 10,817,068 B2
APPLICATION NO. : 15/877911
DATED : October 27, 2020
INVENTOR(S) : Masaaki Yamaoka and Yuki Horiuchi Page 1 of 1

It is certified that error appears in the above-identified patent and that said Letters Patent is hereby corrected as shown below:

On the Title Page

Item (54) and In the Specification, In Column 1, title, after "DETERMINING", insert --A--.

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*